(12) United States Patent
Blinn

(10) Patent No.: US 7,117,256 B1
(45) Date of Patent: Oct. 3, 2006

(54) METHOD AND SYSTEM FOR TRANSFERRING AND SHARING IMAGES BETWEEN DEVICES AND LOCATIONS

(75) Inventor: Arnold Neil Blinn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 793 days.

(21) Appl. No.: 09/997,575

(22) Filed: Nov. 29, 2001

(51) Int. Cl.
*G06F 15/16* (2006.01)
*G06F 9/44* (2006.01)

(52) U.S. Cl. .................................. 709/219; 717/110
(58) Field of Classification Search ............... 348/64; 710/33; 382/263; 709/218, 219; 717/110
See application file for complete search history.

(56) References Cited

U.S. PATENT DOCUMENTS

| | | | |
|---|---|---|---|
| 5,978,016 A * | 11/1999 | Lourette et al. ............... | 348/64 |
| 6,715,003 B1 * | 3/2004 | Safai ........................... | 710/33 |
| 6,788,824 B1 * | 9/2004 | Prestia ........................ | 382/263 |
| 6,980,232 B1 * | 12/2005 | Suzuki ........................ | 709/218 |

OTHER PUBLICATIONS

Hales, M., "Even Easier Image Manipulation", *Journal: PC User No. 293*, p. 71, Publisher: EMAP Computing, Oct. 16-29, 1996, p. 71.
Tan, F.L., et al., "Shareware graphical image viewers and converters a survey", *Computing & Control Engineering Journal*, vol. 8 No. 6, pp. 273-280 (Dec. 1999).
Adobe Photoshop 6.0, "*New Feature Highlights*", (Mac OS 8.5,8.6, and 9.0/Windows, 98/Windows NT 4.0/Windows 2000, pp. 1-23.
Graphic Pump, *Version 1.1 User's Manual*, Copyright 2000-2001 by Graphic Pump, http://www.graphicpump.com, pp. 1-27.

* cited by examiner

*Primary Examiner*—Zarni Maung
*Assistant Examiner*—Karen Tang
(74) *Attorney, Agent, or Firm*—Shook, Hardy & Bacon L.L.P.

(57) ABSTRACT

A method and system of formatting and transferring image data allows a user to easily select image data format settings and format received image data in accordance with the user selected format settings. The user can save the image data to a second location in the format that the user so chooses. Manipulation of image data within the same application usable to transfer that data eliminates the need to rely on multiple applications.

48 Claims, 14 Drawing Sheets

METHOD AND SYSTEM FOR TRANSFERRING AND SHARING IMAGES BETWEEN DEVICES AND LOCATIONS

FIELD OF THE INVENTION

The present invention relates generally to the field of image processing, and more particularly, relates to a technique for providing a user with the ability to easily and quickly reformat and physically transfer images from within a single application.

BACKGROUND OF THE INVENTION

Currently, there are many different devices on the market that have the ability to display images. Most of these devices serve other purposes as well. Commercial products for displaying images include digital picture frames (such as the SMART PICTURE FRAME by KODAK, that cooperates with the STORYBOX network, and digital picture frames by DIGI-FRAME), pocket/hand-held computers, cell phones, and personal computers (PCs). Certain devices, such as FOTOSHOW digital image center by IOMEGA, have the ability to render images via a television screen.

Complicating the user experience, these various image display devices have a spectrum of display characteristics and image data format requirements. Different devices generally render images at different resolutions utilizing different formatting options. For example, a digital picture frame may be able to display an image at a resolution of 640×480 pixels in 24-bit color, while a hand-held computer may at best be able to render an image at a resolution of 320×240 pixels in 8-bit color. Support for many other options also varies from one device to another. For example, some, but not all, devices provide support for embedded thumbnails (thumbnail images inside the image file) for a more efficient user experience. The varying image processing and rendering capabilities are often tied to the memory capacity and processing characteristics of a device, but may also be the result of other design choices and compromises.

In addition to the various format options and special features, all of which may be referred to using the umbrella term "format settings", that may be supported, most devices also support image transfer to or from one or more devices. Thus, there are generally different devices and locations to which an image file may be saved from a particular device such as a PC. Parameters associated with image files such as size, resolution, compression, embedded meta-data (such as thumbnails), bit depth, etc., can affect this image data file size and the overall quality of the rendered image.

Because different devices support varying format options and special features, the currently available general methods for manipulating and transferring image data require the execution of many steps in a number of application programs. For example, to first manipulate image data, a user can choose from among a plethora of image manipulation software, such as PICTURE IT! by MICROSOFT and ADOBE PHOTOSHOP. These and other graphic manipulation programs allow editing and manipulation of images, but require a user to separately specify format information each and every time that the user saves an image, even when the user saves the same image multiple times for use on multiple devices. There currently does not exist an image editing and manipulation application that allows a user to easily and automatically apply format settings to an image at save time. There are programs (such as DEBABELIZER) that allow batch image processing operations to be performed through scripting, and there are ways with the standard programs mentioned above that one can create "Macros" of manipulation functions to perform image processing. However, both of these techniques require deep knowledge of the applications being used to perform the manipulation and as such are out of the reach of most casual users.

In addition, existing graphic editing and manipulation applications do not provide a mechanism for transferring an image from a device or location to a new device or location while applying formatting rules that a user had previously specified. Thus, even applications that allow data manipulation, such as cropping, resizing, padding, adding borders, etc., force a user to set pertinent rules each and every time that the user wishes to save the image. They also force the user to "save" the image to the hard disk and ultimately use some other means to transfer the image to the target device.

One example of such a graphical manipulation program is PHOTOSHOP. In PHOTOSHOP a user can graphically manipulate and edit image files. However, the user must choose from palettes, brush options, cropping options, etc., after the image is selected. For example, the user might choose a background first. Then the user can go to a different menu to choose brush options, and still a different menu for cropping options. Then the user must, for example, save the image to a disk specifying image compression settings. The user then ultimately must use a different application to transfer the image data to another display device such as another PC. Finally, if the user wants to save another image with the same formatting, they must repeat the above steps even when the target device, such as a pocket PC, is the same. When using PHOTOSHOP, an advanced user might create a "macro" to repeat these image processing operations, but this is both difficult to learn and cumbersome to set up.

DEBABELIZER is very similar to PHOTOSHOP. However, unlike PHOTOSHOP, it does not require a graphical program to manipulate an image, but rather requires scripting on the part of the user. DEBABELIZER is a program that allows a user to perform a range of script-based image-processing operations through batch processing. It has image manipulation tools for canvas resizing and scaling, as well as commands to flip, rotate, and crop images. In addition, a user can set specific settings for intensity, contrast, gamma, hue, saturation, and brightness controls for later use. However, DEBABELIZER does not allow a user to save manipulation settings without the use of a script. DEBABELIZER, a program designed for business level automated digital media processing, does not provide the ease of use necessary to allow an unsophisticated user to quickly and simply execute image manipulation and transfer.

There are similar shortcomings in graphical "photo album" and thumbnail manipulation applications. THUMB-SPLUS by CERIOUS SOFTWARE executes various types of thumbnail manipulation. For example, THUMBSPLUS can create thumbnails corresponding to files, either automatically or manually, allowing a user to: (1) specify a thumbnail view from customizable views; (2) customize these views; and (3) create galleries of thumbnails. These galleries in THUMBSPLUS can be displayed together in files as a graphical photo album. Manipulation programs such as THUMBSPLUS generally allow images to be defined by file name. In addition, they allow basic image formatting, such as adjusting color, rotating, resizing, overlaying images or text, filtering, cropping, and adding backgrounds, for different sizes and resolutions through a save dialog. However, such applications are normally limited to processing image files with certain size and resolution characteristics. In addition, to the extent that THUMB-SPLUS allows thumbnail graphical manipulation, it is not generally applicable in that it only allows manipulation of thumbnails. These applications are also tailored to viewing images on computers in browser applications, and are inapplicable to a wider variety of devices.

As described briefly above, after a user has spent the time necessary to edit and manipulate an image in a first program, the user generally must then use a second program to transfer the image data to another display device. Sometimes specific display devices such as the DIGI-FRAME are shipped with applications that facilitate integration of image data onto the specific device. However, these applications are normally crude, rarely contain formatting rules, and are greatly limited because they are device specific.

The STORYBOX NETWORK, which supports KODAK's SMART PICTURE FRAME, does allow a user to schedule delivery of photographs though a modem to the display frame. The SMART PICTURE FRAME is set by default to download images from a user's account on the Internet (into which the user previously uploaded images) in the STORYBOX NETWORK at 6:30 A.M. daily. A user can change this setting, and may have the Frame connect to the network up to four times per day. However, there is only very limited user control available in this system. In fact, the only control exercised by the user is over whose images are in his account on the network and the schedule on which images are downloaded. In addition, the user must go to a separate web site to exercise the limited control that he has over the pictures that are received. Further, while this application will size the image before downloading it to the frame, it is very limited because images first must be loaded to a specific site, a user does not have substantial control over which images are sent at each scheduled time or at the end of each scheduled interval, and it only works with this device in this limited capacity.

SUMMARY OF THE INVENTION

A method and system are described herein that provide a user with the capability to easily transfer and share images between two different display devices, or locations, with possibly different display characteristics. In an embodiment, the different locations are on one device. The described techniques and system provide enhanced ease of use for the formatting, configuring, and saving of digital photos of different sizes and resolutions. In an embodiment, the present invention enables a user to place images on multiple devices without the need to reconfigure, reformat, and resave the image as a new image file. Generally, this is achieved by providing the ability to set format settings (i.e. formatting rules and manipulation functions) before an image file is selected.

In one embodiment of the invention, a user can save desired format settings in a single file, termed a "profile," at or before save time. Each profile can be associated with a specific device that a user may wish to transfer an image to, and may be named in a way that facilitates an association in the user's mind to the appropriate device. Thus, a user can quickly and easily save an image to a specific device and apply format settings tailored to that device in one embodiment of the invention.

In a further embodiment of the invention, the formatting and transferring of an image to different locations and devices can be scheduled for automatic periodic execution at user-selected intervals. This allows a user to automatically send images to a desired location via a pre-set schedule, such as once per day, once per week, or once per month.

Modes of transferring image data include, but are not limited to: (1) transfer through a serial port, (2) transfer from one location on a hard drive to the same or another location, and (3) transfer over the Internet, a local area network (LAN), a wide area network (WAN), or another network.

In an embodiment, a user of a receiving device is provided with an ability to configure the receiving device to automatically format and save or transfer image data based upon an identification of a sending source from which the image data came. This is accomplished by use of a set of rules at the receiving side that select image data format options and target locations based upon the sending device or sender identity. Thus, for example, in an embodiment a receiving user's PC has pre-set rules that associate an identification of a sending user or their sending device to a set of format settings and a location in the receiving user's device. In this manner, image data received by the receiving user from the specified sending user will automatically be properly formatted and transferred to the specified location.

Further embodiments of the present invention allow a user to send a plurality of images to the same device or to a plurality of devices.

DETAILED DESCRIPTION OF THE PREFERRED EMBODIMENTS

Figure 1:
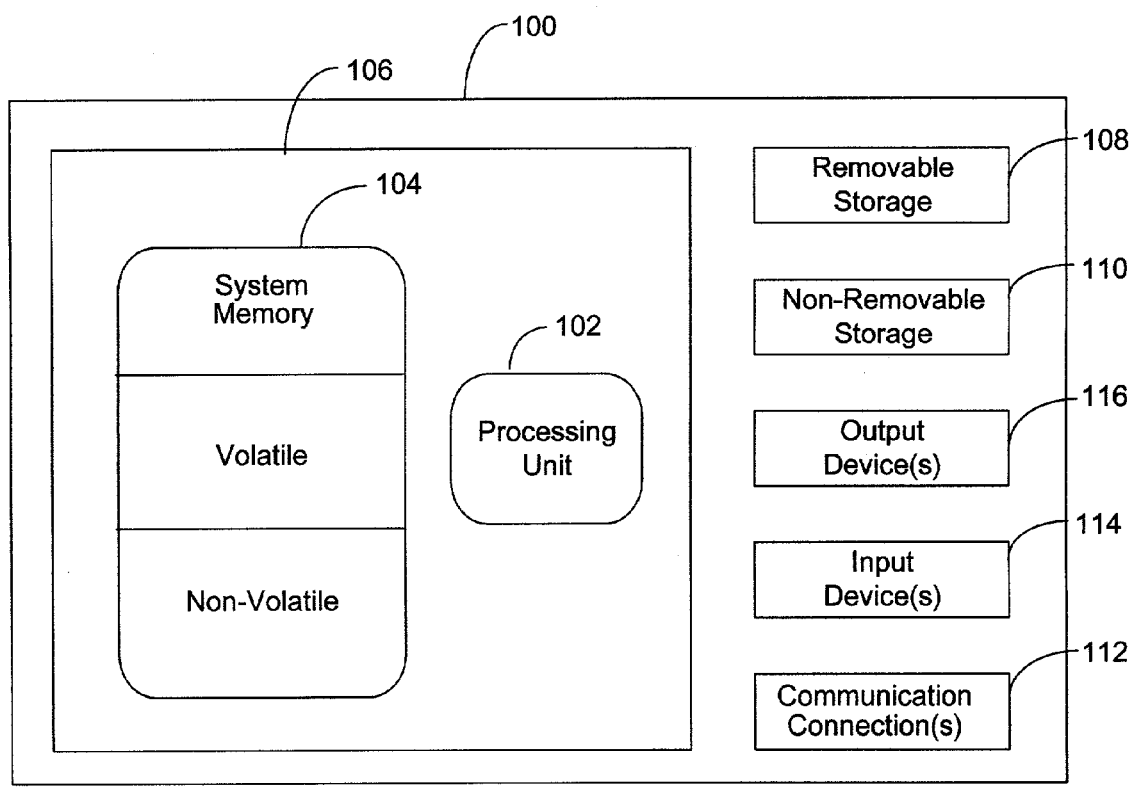
FIG. 1 is a block diagram generally illustrating an exemplary computer system usable in an embodiment of the invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with any computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

In overview, the present invention relates to methods and systems for transferring and sharing image data in an efficient and user-friendly way. More specifically, certain embodiments provide for the transfer and sharing of images between two devices or locations, wherein the format settings of an image at transfer is associated with base line display features for the receiving device, freeing a user from selecting format options for an image each time the image is saved. A user can pre-set formatting rules to be applied each time any image is saved or transferred to a particular device or location. In addition, in one embodiment, the user may command that the pump application apply arbitrary format options to the image data, rather than select or set format settings. A set of format settings includes any manipulation functions, user-entered settings, etc., used to process, print, store, and/or manipulate data.

In one embodiment, the user names each set of saved format settings, so that subsequent uses of a particular set of format settings can be achieved by simply choosing the appropriately named format profile. Typically, a user would name the set of format settings to correspond to a device that the format settings are designed to accommodate, thus allowing a user to quickly and easily format and save subsequent images to the device.

With reference to FIG. 1, one exemplary system for implementing embodiments of the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 within line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media include volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain one or more communications connections 112 that allow the device to communicate with other devices. Communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

Device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

In this embodiment of the invention, we will refer to an application as the "pump application." The term "pump" indicates a process of moving, or pumping, images from one location to another while applying transformations.

In general, there are a number of ways provided for a user to initiate the pump application described herein, such as by clicking on a graphic pump icon presented on the desktop of a PC, or if the pump application is integrated with the operating system, by right clicking on an image of interest or on an icon associated therewith. Once the pump application is running, and an associated dialog box presented, the user may select a file menu option presented in the dialog box and open an image file into the pump application. Alternatively, the user may drag and drop an image file icon into the pump application dialog box. At that point the user is presented with numerous options under a file menu including an option to pump an image on demand. Once the user selects this option, he is presented with the dialog illustrated in FIG. 4. If the user instead selects format profiles from the Edit menu, the user is presented with the format profiles dialog illustrated in FIG. 2. If the user clicks either "New" button 202 or "Edit" button 203, the user is presented with the format settings dialog in FIG. 3. However, in one embodiment, a user may select a format profile from the list in dialog box 201 and invoke this format profile by actuating the "OK" button 207. Each of these activities and options will be discussed in greater detail hereinafter.

Generally, a user of a PC or other display device retrieves an image from a first location. The user may retrieve the image data from any one of a number of sources, such as via scanning of a photograph, via transfer from a capture device such as a digital camera, via transfer from a file system stored in either non-volatile or volatile memory or storage, or via a file stored on a node of a network. The user will often desire to manipulate the image data or format the image data for display on a second device or location, such as a digital picture frame.

Figure 2:
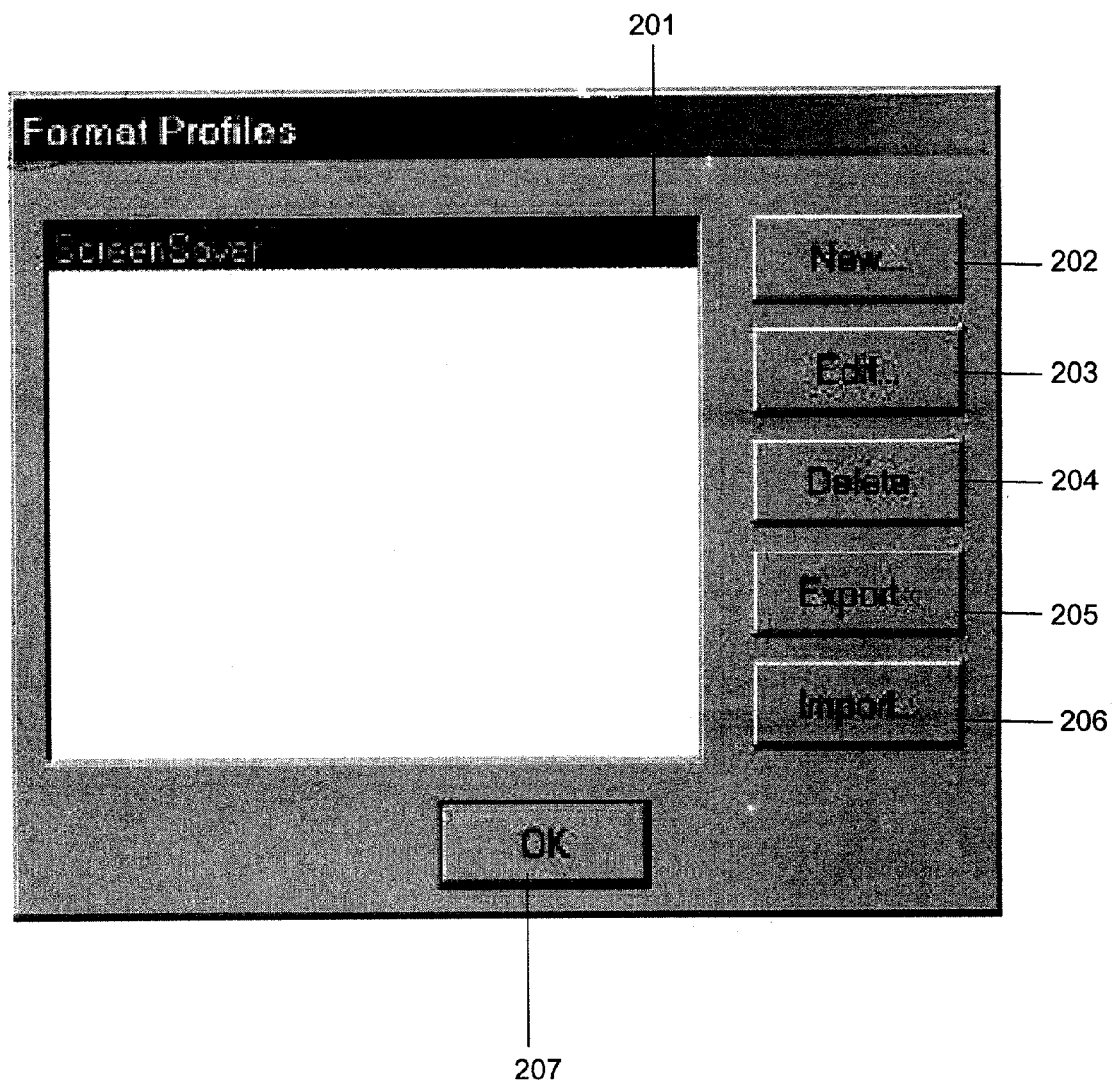
FIG. 2 is a simulated view of an exemplary user interface, or dialog, according to an embodiment of the invention, presented to a user when the user chooses to create a profile.

If the user wishes to save format settings for use in the future, the user may access a user interface (UI), such as that depicted in FIG. 2, by selecting "format profiles" from the Edit menu associated with the main dialog. This dialog illustrated in FIG. 2 allows a user to create a format profile. The use of a point and click system pictured is one possible UI, but a skilled artisan will recognize that there are many types of interfaces that would allow a user to invoke the functions of this method.

Figure 3:
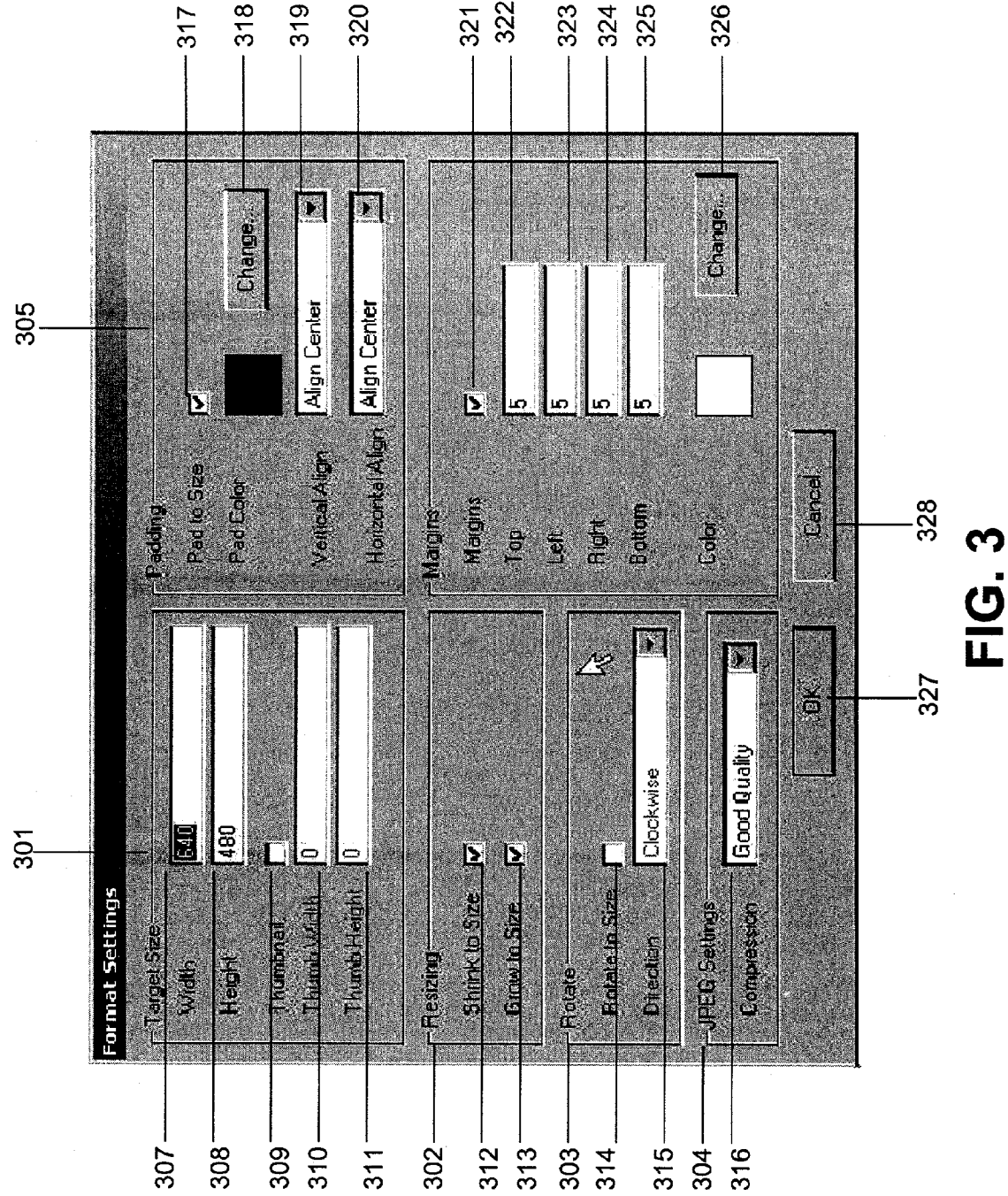
FIG. 3 depicts a user interface, or dialog, presented to a user in an embodiment of the invention to allow the user to set rules for image data formatting and manipulation.

Available format profile attributes settable by the user include a profile name and profile settings, which are chosen through a setting dialog, such as that pictured in FIG. 3. Once the user creates a format profile, the format profile dialog box, as pictured in FIG. 2, allows the user to easily and quickly perform image manipulation according to the saved profile by simply identifying that profile, such as by name, prior to transfer or saving of image data.

The "New" button 202, when activated by the user, allows the user to create a new format by invoking a dialog box that saves a profile by name as will be discussed hereinafter. By selecting the "Edit" button 203, a user invokes an edit dialog, which allows a user to edit an existing format profile, according to the user's choice from a profile list 201. This allows a user to edit both the profile name and the profile settings through a profile settings dialog box, such as that illustrated in FIG. 3.

A user can delete an existing format profile by using the "Delete" button 204. In order to use this function, the user preferably first selects a profile from the profile list 201 and then invokes the delete function by clicking the "Delete" button. The user applies a format profile to an image by selecting the format profile and clicking a graphic actuator, such as "OK" button 207.

In one embodiment, the format settings dialog, as illustrated in FIG. 3, allows a user to specify settings when the user creates a new format profile or edits a pre-existing profile selected from the dialog box illustrated in FIG. 2. This dialog allows a user to pre-set all his format settings for quick and easy saving.

In particular, referring to the Format Settings dialog illustrated in FIG. 3, a user has the option of setting numerous graphic display rules and invoking numerous manipulation functions such as a resizing function, a rotating function, a padding function, a compression function, and any other available functions. For example, if the user desires to set a target size, the user invokes the resizing function and sets the target width and target height by entering a desired height and width in the target width field 307 and the target height field 308. The user invokes the resize function by either checking the "Shrink to Size" box 312 or "Grow to Size" box 313. Both of the resizing functions maintain the aspect ratios of the images. Thus, for example, if the user wishes to shrink an image with a display resolution of 200×100 pixels to fit on a device with a display resolution of 100×100 pixel, the image will be resized to a display resolution of 100×50 pixels, unless otherwise specified by the user. Similarly, selecting Grow to Size will expand an image with a display resolution of 10×20 pixels to a display resolution of 50×100 pixels to better fit on a device with a display resolution of 100×100 pixels.

Once the user invokes either resize function, the user may wish to fill the pixels that are left empty because of the image resizing due to the unchanged image aspect ratio. To do so, the user invokes the padding function by checking padding box 317. The "Change" button 318, when selected, allows the user to alter the color of the padding. The user optionally may align the image data to pad the image in different configurations. To do so, the user simply specifies whether to align the image right, left, or center, on the horizontal scale by use of drop down menu 320, and whether to align the image to the top, bottom, or center, in vertical drop down menu 319.

The user may also specify that a thumbnail be embedded in the resulting image file. For example, the jpeg standard allows a smaller resolution image to be written to the final file for optimizing the display on certain devices. In the embodiment illustrated in FIG. 3, the user checks thumbnail box 309 and sets thumb width and thumb height by entering a desired height and width in data fields 310 and 311, respectively.

The user may also want to create margins around the image to give the image a photographic feel. In the embodiment illustrated in FIG. 3, the user creates such a margin via the margin dialog box 306. To construct the margins, the user first chooses to create a margin by checking box 321, then specifies margin dimensions by entering the desired dimensions in data fields 322–325 for top, left, right, and bottom, respectively. The "Change" button 326, when selected, allows a user to choose the color of the created margin.

Other formatting options are preferably made available to the user as well. In an embodiment, the user is given the ability to rotate an image in order to transfer the image data to a device with different resolution aspects. For example, the user may choose to transfer image data from a display device with a display resolution of 640×480 pixels to a display device with a display resolution of 240×320 pixels. The user resizes the display resolution of the image and rotates the image to better fit the display device resolution characteristics by selecting the rotate function. The user selects "Rotate to Size" via check box 314, specifies a direction through the use of drop down menu 315, be it clockwise or counterclockwise, and specifies the desired image height and width in data fields 307 and 308, respectively. Selecting this option will cause the image to be resized to the user specified target width and height and rotated ninety degrees in the specified direction in order to better display the image on the second device.

If the user is saving or transferring the image file to a device that has limited memory, the user can choose to have the image data compressed. In order to have the image data compressed to the appropriate degree, the user specifies that the image be compressed, as well as the degree of compression, by selecting the compression depth in drop down menu 316 under JPEG settings dialog 304, as depicted in FIG. 3. Those of skill in the art will recognize that other base line formatting options not set forth herein may be applied in the above-described manner within the scope of the invention.

In addition, those of skill in the art will recognize that in this embodiment some of the above examples (compression, thumbnails) are specific to the JPEG file format and standards. However, this functionality may be applied to any other image file format or standard, such as graphics interchange format (gif) and portable document format (pdf). In one embodiment, format settings might include other common image processing functionality, such as cropping an image to a desired size, where to crop, lighten, darken, etc.

As previously stated, typical image processing and transfer mechanisms require the user to choose certain format settings at save time, and perform certain manipulation functions prior to save time in order for an image to be properly formatted for a particular device or location. However, the pump application allows the user to save the format settings previously discussed in a format profile. Subsequently at image save time, the user simply selects the desired format profile to apply the format profile operations and rules to the image data being saved or transferred. This ability saves a user time by allowing him to save a properly formatted image without the need to choose values for, and apply, all appropriate image data manipulation operations each time the user wishes to manipulate, save, or transfer the image data.

Figure 5:
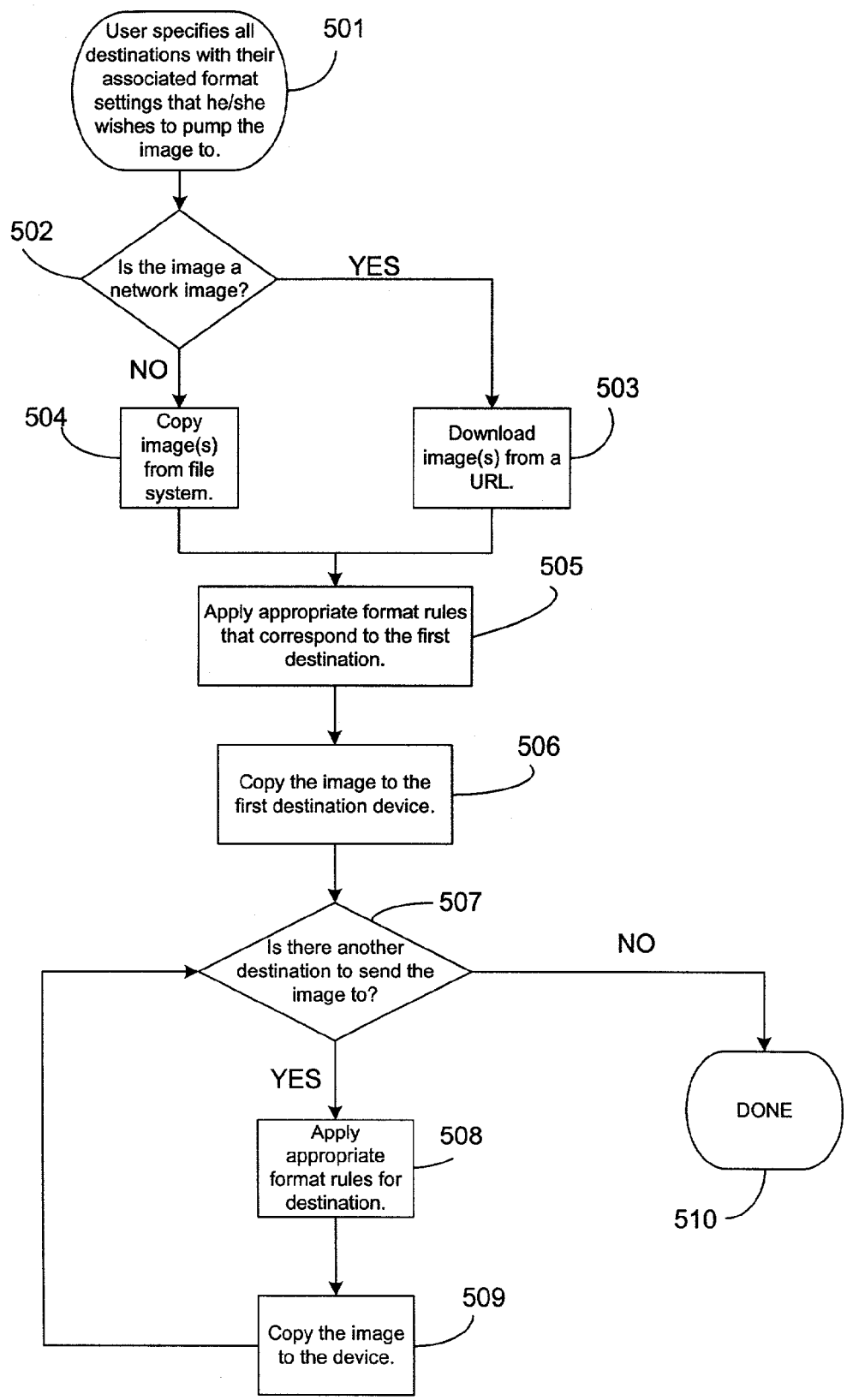
FIG. 5 is a flow chart illustrating a process used to retrieve image data from one destination and save it to another destination while applying image data formatting rules in an embodiment of the invention.

Turning to FIG. 5, a flow chart showing the steps of the image pumping function within an embodiment of the invention is illustrated. Initially, in step 501, the pump application on the personal computer 100 retrieves an identification of the image data and information regarding a destination from the user. In a further embodiment, the user specifies multiple destinations and format settings in this initial step. The user may enter these destinations in the pump dialog or, in an embodiment where a task is being implemented, the destinations are specified in the attributes of the task, discussed fully hereinafter. The destination information preferably includes the desired image formatting rules, as specified by the user or as specified in a profile selected by the user, and the identity of the target device.

There are a number of different methods usable to initially retrieve the subject image data. If the image data is already on the saving or transferring user's PC, such as in the non-removable storage 110, the file is simply retrieved from the appropriate file on the storage 110. If the image data resides on a network, such as the Internet, that the user's PC is connectable to, the image data is retrieved over the network by a downloading operation, such as via the http, https, ftp or other network protocol. Another possible source of image data is an image source device connected to the user's PC 100, such as through a serial port interface. Retrieval from such a device may be by way of any communication mode usable between the external device and the PC. One skilled in the art will recognize that there are many ways to retrieve a file from a location, and the examples set out above are presented for purposes of clarification and are not meant to limit the scope of the invention.

In step 502, the pump application examines the identification of the image data and determines whether or not the image is a network image, such as a web image, depending upon the address or file name, such as that entered by the user in source dialog box 401, to be used to retrieve the image data. In an exemplary embodiment, the user may also specify a filename by selecting the "Browse" button 402, which, when selected, allows the user to search a file system and click on the name of a file to select that file. A skilled artisan will recognize that there are other methods usable to retrieve an image from a scanner, other capture devices, etc.

In step 502, if the pump application determines that the image data corresponds to a network image, i.e. an image residing on a node of the Internet or other network, then the network image is downloaded at step 503. If at step 502 the pump application determines that the image data does not correspond to a network image, such as a web image, then in step 504 the image is copied from the appropriate local file. Those of skill in the art will appreciate that the image data may not correspond to a network image or a local file, but rather may be accessible via a non-network connection, such as via a serial port of the user's PC. In such a case, the pump application recognizes this at step 502 from an examination of the identification of the image data, and retrieves the data via the connection in an alternative step (not shown) to steps 503 and 504.

Figure 4:
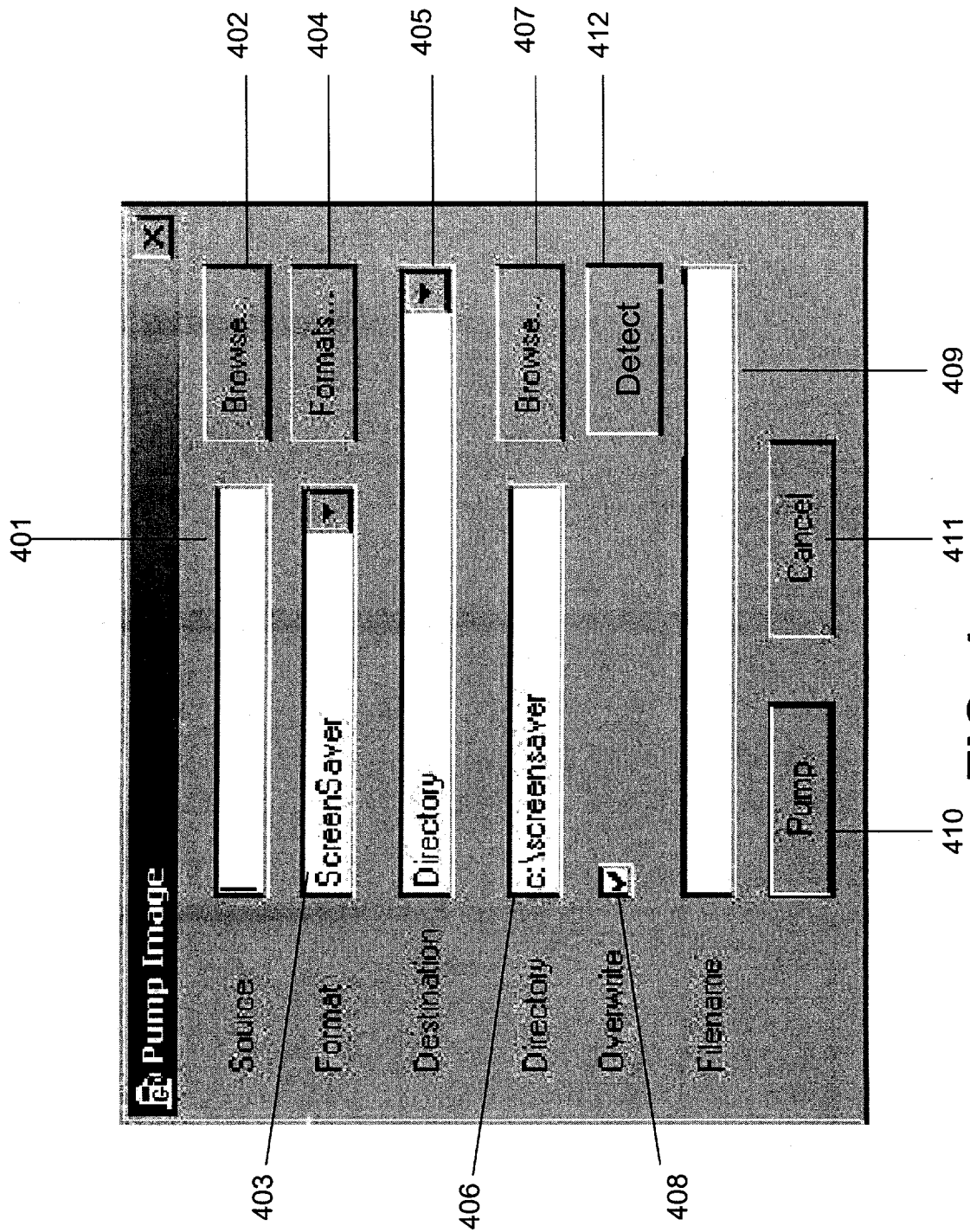
FIG. 4 depicts a user interface, or dialog, presented to a user in an embodiment of the invention to allow the user to pump, or transfer, image data.

In step 505, the pump application applies the appropriate format settings for the first destination to the initial image file that is retrieved. Typically, the user applies format settings previously saved in a format profile that was previously specified. As discussed hereinafter, the user can set the format profile through the use of a drop down menu 403, as illustrated in FIG. 4. The user can also specify that a new format be configured by selecting the "Format" button 404.

Accordingly, after the format settings are applied to the first image, the pump application copies, or saves, the properly formatted image file to the proper destination in step 506. The reader will appreciate that during the process shown in FIG. 5, the originally retrieved image data may be saved as a temporary file, whereupon the format settings and manipulation functions may be applied to this temporary file to develop the properly formatted file to be copied or saved to the selected destination in step 506. In a further embodiment, the application also applies these transformations to a copy of the image in memory.

In step 507, the pump application determines whether the user specified multiple destinations and, if so, it determines the next destination for the image. If the user had chosen a directory as a destination, the user may have either: (1) entered a directory in the directory dialog 406 or (2) browsed the file system for a desired directory by selecting the "Browse" button 407. In this manner, the pump application determines whether there is another set of format settings for and destination to which to send the image file, and if so, what the destination and format settings are. If it is determined that there is another destination and format, the pump application executes step 507 and the steps that logically follow. Otherwise, the process terminates at step 510.

The logical process loop shown in FIG. 5 at step 507 et seq. thus allows the user to send an image to multiple destinations and apply multiple format settings without re-invoking the pump application. In particular, as shown, the pump application sequentially processes the image data to different formats and destinations until all specified destinations have been served.

FIG. 4 depicts a user interface for invocation by the user of the process depicted by the flow chart of FIG. 5. In this embodiment, the image is only formatted and saved to one destination. Initially, the user identifies the image to be pumped in source field 401. To accomplish this, the user can insert in the source field 401 the name of the file that is to be pumped. Alternatively, a user can activate button 402 to access a browse facility whereby the user can view all files accessible by the personal computer 100 in order to find the file or files to pump. This embodiment demonstrates the ability to enter a URL or file name as the source of the image. In this embodiment, the user also specifies the applicable format profile or profiles at this time.

The destination option field 405 illustrated in FIG. 4 and discussed in the flow chart of FIG. 5 contains the description of the image file save target. This destination can be any one of a number of different locations, but, in one exemplary embodiment, two generalized destinations to which the image can be saved or transferred are a "Directory" and a "Serial Port." One of skill in the art will recognize that numerous other destinations exist, such as a file stored in volatile memory, a file stored in non-volatile memory, a file stored on a digital picture frame or other output device, a peripheral device, or a file stored on a node of a network to name a few. A "peripheral device" is any device that can be connected to the personal computer, such as a digital picture frame, a pocket PC, or a printer to name a few. In addition, the peripheral devices and other destinations are connectable to the PC, such as via a serial port, USB, SCSI, FIREWIRE, wireless network connection to the PC or wireless network connection to a network at large, etc. One of skill in the art will recognize that these are only examples and are not meant to limit the present invention.

The directory destination specified is generally a file in a file system accessible by the user's device. Thus, for example, when the user wishes to download image data from the Internet or other network onto his PC, or to send an image from one directory to another, then the destination is a directory. In one embodiment, when the destination equals directory, the user may invoke an overwrite function via field 408, causing the system to automatically overwrite any image data pre-existing in the destination directory at the time of transfer without generating an error visible to the user.

The user may also send the image file to a digital picture frame or other external device, instead of a directory. When the user wishes to transfer the image data to a digital picture frame or other external device connected to a port, such as a serial port, of the user's PC, the target is termed a "Port." To use this option, the user should have a destination device connected through a serial port interface, or other port, to the personal computer 100. In one embodiment, the user specifies the serial port where the digital picture frame, or other device, is connected. The pump application saves the retrieved image data to a temporary file, or otherwise places the image data in memory on the personal computer 100, applies the specified manipulation functions, as selected in a pre-set profile, to the temporary file, and then transmits the data corresponding to this file through the serial port to the digital picture frame, or other device.

In an alternative embodiment, the pump application automatically detects a destination device connected to a port. The user invokes this function by selecting the "Detect" button 412, which is presented at the dialog box. Typically, the user should also identify the type of media, such as COMPACT FLASH or SMARTMEDIA, utilized by the digital picture frame, although in an alternative embodiment, the media type is automatically detected by the pump application without being specified by the user. A filename in the name field 409 indicates the final filename of the image data when saved in the directory, or when saved to the digital frame, for frames that have this ability. Of the above described options, the source, format, destination, filename, and, if the destination is a directory, directory field should be specified or selected, while the overwrite, and if the destination is a port, the port and the filename fields may optionally be specified or selected. In other embodiments to support other devices, additional settings and attributes would be presented at this time that the user may need to specify. After setting any desired options and providing the required information to the application as described above, the user can save properly formatted image files to the specified device or location by activating a graphic actuator, such as the "Pump" button 410.

Figure 6:
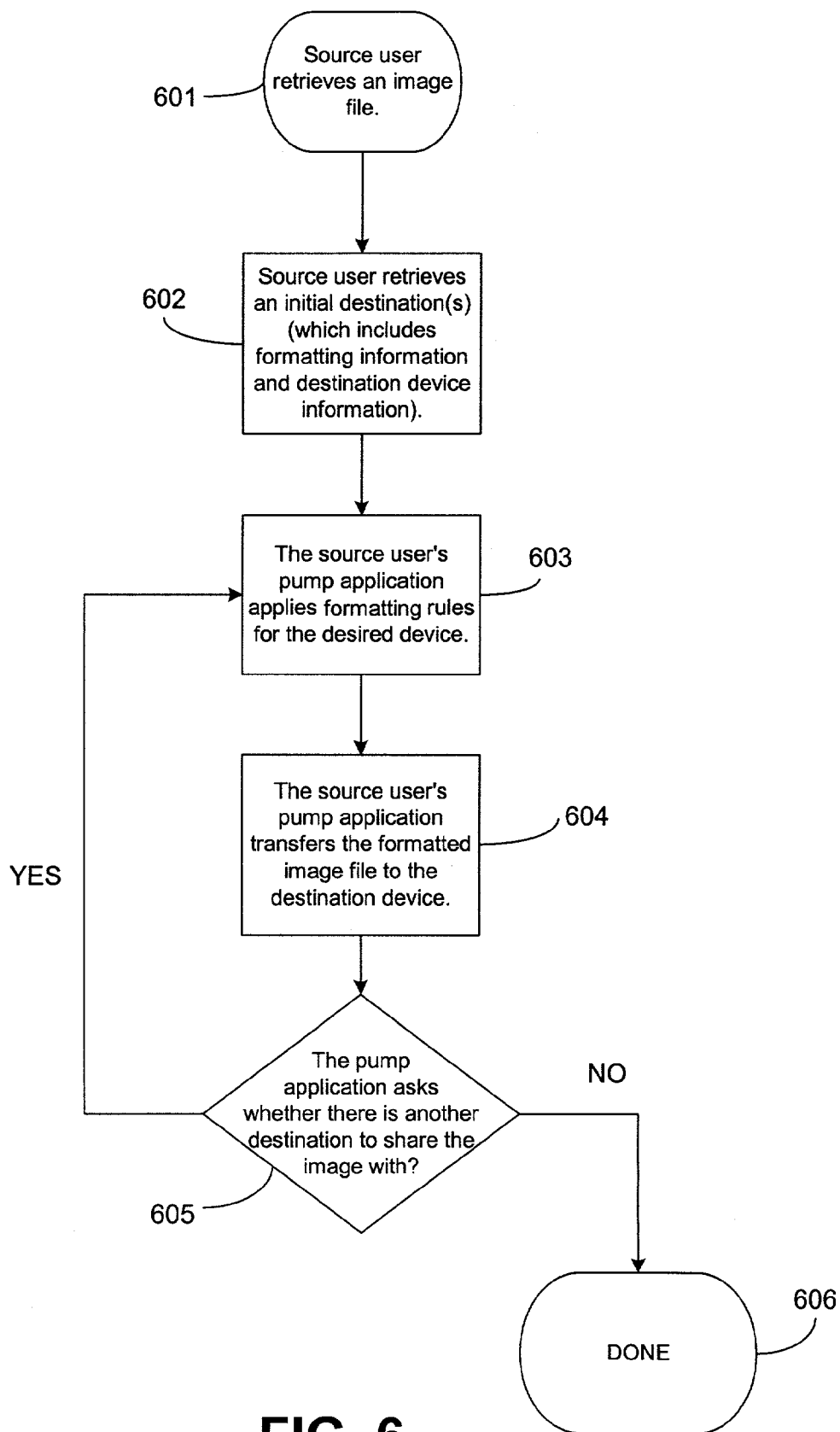
FIG. 6 is a flow chart illustrating a process used in an embodiment of the invention to share images with pre-set formatting options.

Turning to FIG. 6, a flow chart is depicted that represents steps taken to share an image in an embodiment of the invention that allows a sending user to share an image with a receiving device. In step 601, the sending user retrieves an image file in any manner, as in FIG. 5. In step 602, the display device associated with the sending user's personal computer retrieves an initial destination, including the format settings and device to send the image data to. In step 603, the sending user's pump application applies the format settings necessary to display the image on the receiving device, such as may be contained in the pre-set format profile. For example, a sending user retrieves the receiving device's necessary format settings for a pocket PC in step 602 and then at 603 the pump application applies these format settings. In step 604, the sending user transfers the formatted image file to the receiving device, such as via file copying, via the Internet, via FTP on a network, etc. In step 605, the pump application determines whether or not there is another destination to transfer the image to. If there are other destinations to share or transfer the image to, the pump application returns to step 603. The logical process loop shown in FIG. 6 at step 603 et seq. thus allows the user to share an image with multiple destinations without re-invoking the pump application.

In a further embodiment, the user sets the pump application to automatically run the transfer and sharing of image data through a series of pre-defined automatic jobs that will be referred to as "tasks". Once the pump application is running, the user may access the task dialog by choosing the "Edit" menu and selecting the "Tasks" option. At this point they can create a new task or edit an existing one.

Figure 7:
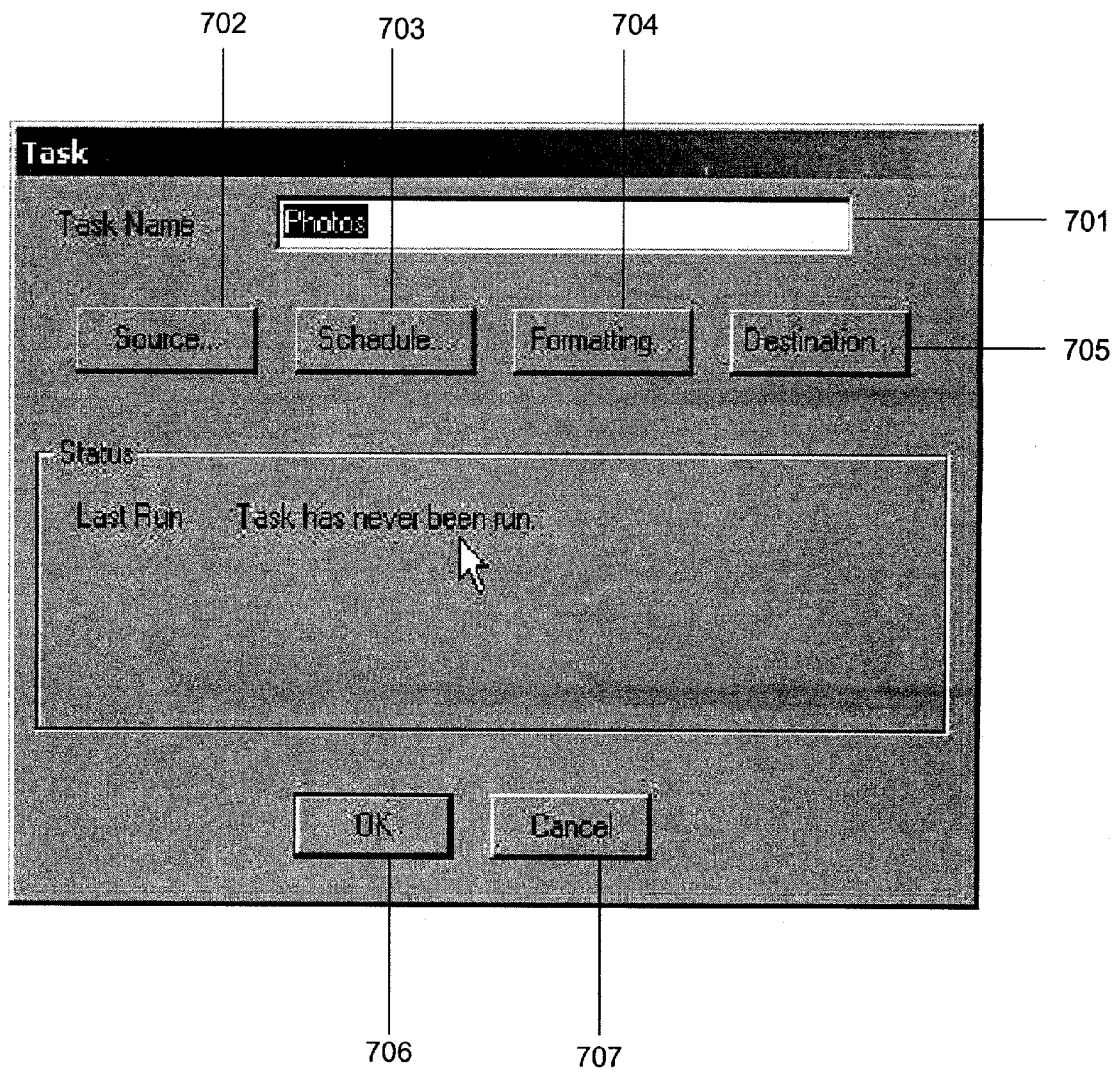
FIG. 7 depicts a user interface, or dialog, presented to a user in an embodiment of the invention to allow the user to create and manipulate tasks.

To invoke this mode of operation the user defines a task. A task is any list of operations that a user would like to have performed on a periodic scheduled basis. This tasking allows a user to run the pump application either on demand or repeatedly on a schedule. A basic user interface presented to allow the user to invoke this function is illustrated in FIG. 7. As can be seen, there are four attributes that define tasking of the pump application. These four attributes, as buttons 702–705 illustrate them, respectively are: (1) a source; (2) a schedule; (3) a format; and (4) a destination. The format and destination attributes can be any appropriate format and destination information, such as that previously described, or could be a number of formats and destinations in tandem.

The source is the original location of the image data. The source may be a URI, a list of URIs or a graphical pump album file. In one embodiment, a URI may specify either (1) a file in a file system or (2) an image source on a network, such as the Internet. In other embodiments the source may be any of a number of other devices and systems, such as a file in the non-volatile memory of a personal computer, a file in the volatile memory of a personal computer, a file on the node of a network, an image retrieved from a scanner, a camera, a peripheral device, or other image-sourcing device.

A graphical pump album file is a file composed of a list of other image files, such as URIs. The graphical pump album file is useful because it allows a user to avoid reconfiguring the pump application each time he changes the number of images being pumped, etc. By setting the source as a graphical pump album, the task will accordingly retrieve all the images in the graphical pump album on a periodic basis or on demand, dependent upon the schedule settings discussed in greater detail hereinafter. For example, a graphical pump album file may comprise four images on one day when the task retrieves the images, and five different images on a different day. While this change in the number and identity of image files would ordinarily require the user to reconfigure the pump application to process the five image files as opposed to the four image files if the source was a list of URIs, the use of a graphical pump album file allows a user (or another user behind the scenes) to simply reconfigure the graphical pump album file instead. Other embodiments might go to a source and fetch all available images, only the top 10 new images, images changed from a certain time period, etc.

Figure 8:
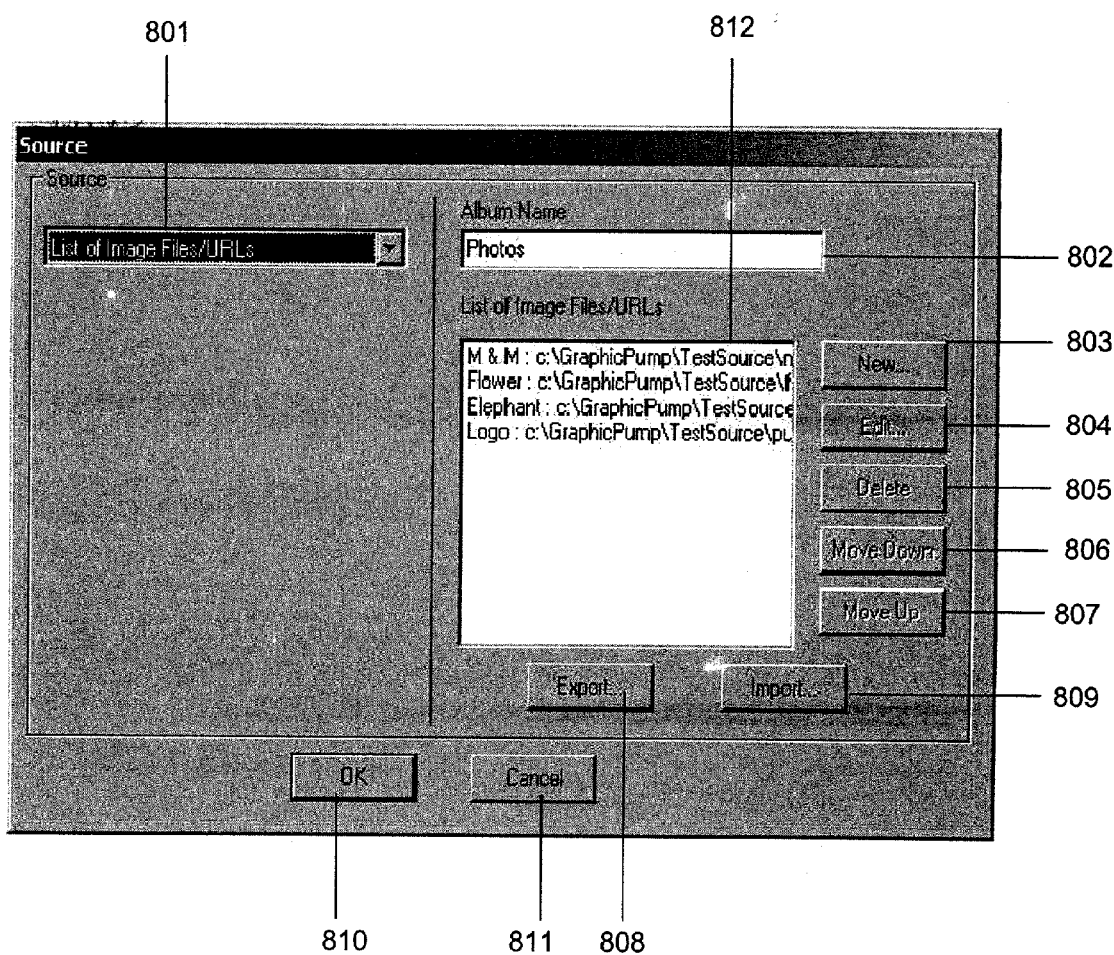
FIG. 8 depicts a user interface, or dialog, presented to a user in an embodiment of the invention for setting an image data source.

A user calls the source dialog by clicking on the "Source" button 702. An exemplary source dialog box is illustrated in FIG. 8. This dialog box is just one of many UI's that can be used for determining the source of the image file to be pumped or saved.

The user should first specify the image data to be processed. One way for a user to specify the image data is by using a source dialog box such as that illustrated in FIG. 8. Typically, the source is either a list of individual image files or a single graphical pump album file. In the embodiment illustrated in FIG. 8, a drop down menu 801 in the UI can be used to specify the source. In the illustrated scenario, the user has selected a list 812 of URIs, each of which is specified individually.

Using this task dialog, such as the one illustrated in FIG. 8, a user can create a graphic album for any device or location. The user can name the album by entering a name in a data field 802, bring in new images by selecting the "New" button 803, edit the images by selecting the "Edit" button 804, and order the images by use of "Move Up" 806 and "Move Down" 807 buttons. The user may export the list 812 of URIs into a graphic pump album by clicking an "Export" button 808, or import a graphic pump album file into the task by clicking the "Import" button 809.

Figure 9:
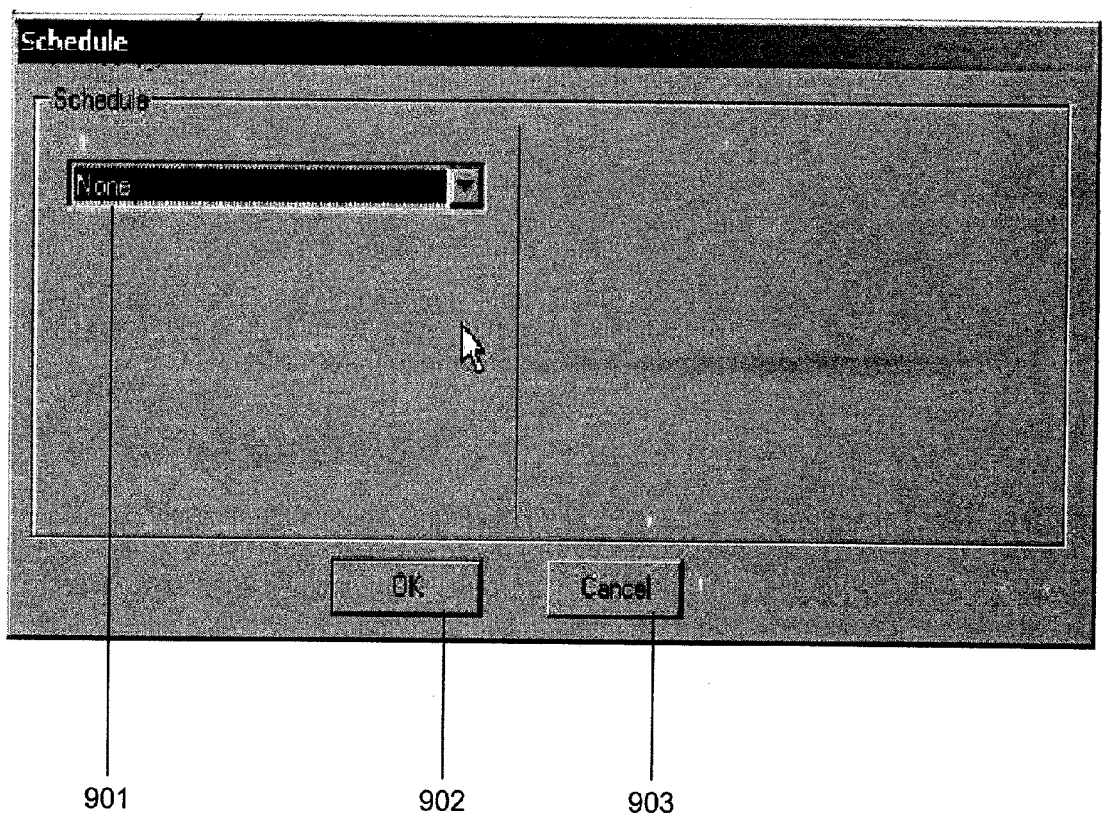
FIG. 9 depicts a user interface, or dialog, presented to a user in an embodiment of the invention for setting an image processing schedule.

The user can specify that the retrieval, saving, formatting, and transferring of the image data run on a schedule through the task scheduler. A schedule is used according to a task in an automated fashion to execute the image manipulation and transfer of images. In one embodiment, the scheduling options are "on demand," "hourly," "daily," "weekly," and "monthly." Initially, the scheduling option is set to "on demand," which means there is no schedule in progress, i.e. tasks are by default run "on demand." A user interface such as that pictured in FIG. 9 facilitates the user's choice of a schedule time frame by use of a drop down menu 901. The drop down menu 901 lists schedule options including, in one embodiment, "hourly," "daily," "weekly," and "monthly," any one of which is selectable by the user. The user exits the dialog and applies the task scheduler, such as by selecting an "OK" button 902, when finished.

Figure 12:
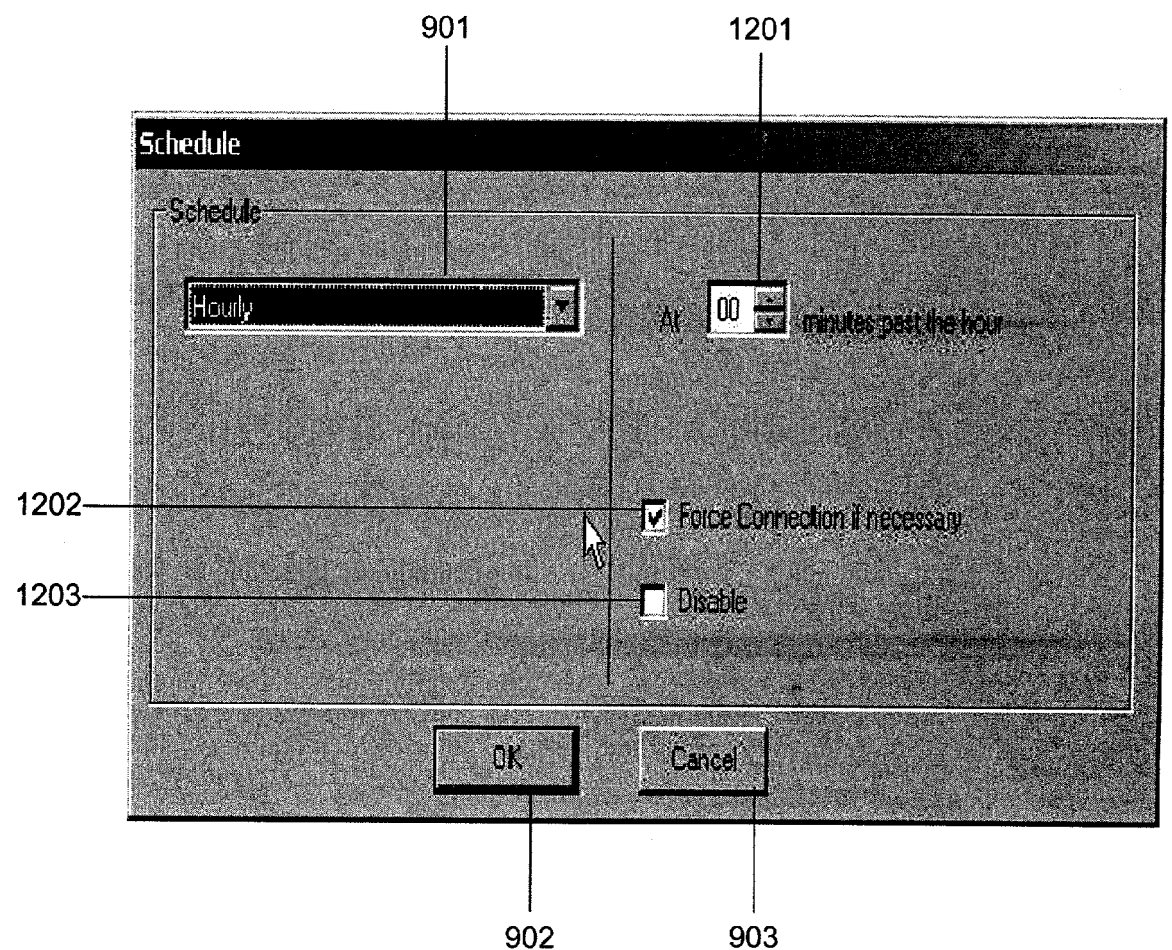
FIG. 12 depicts a user interface, or dialog, presented to a user in an embodiment of the invention regarding a scheduled task.

If the user chooses "hourly" from the drop down menu 901, a user interface such as that illustrated in FIG. 12 is invoked. The user may then set the scheduling options by setting the time past the hour at which the task should run in data field 1201. The user may also choose whether or not to force a connection if necessary at check box 1202. Checking box 1202 causes the pump application to force an Internet connection, or other network connection, when the scheduled time arrives. The pump application should be in the start up menu to be properly configured to force a connection.

There are several ways to terminate or disable a scheduled task. With respect to the pictured user interface, the user can simply select the "Disable" option by checking box 1203. When the user is finished, he can click the "OK" button 901 to enter any changes he may have made.

The task applies the pre-set format settings that the user selects to the image data retrieved from the source. The user sets these rules by entering the task name into data field 701 in FIG. 7, and clicking the "Formatting" button 704, which invokes the Format dialog in FIG. 13, explained in more detail hereinafter. Similarly the destination can be specified with the "Destination" button 705 to specify the receiving display device or devices. In this embodiment, one format and destination are specified. However, in other embodiments multiple formats and destinations may be specified for the images in the task. Note that the formats and destinations are similar to the examples described above.

Figure 10:
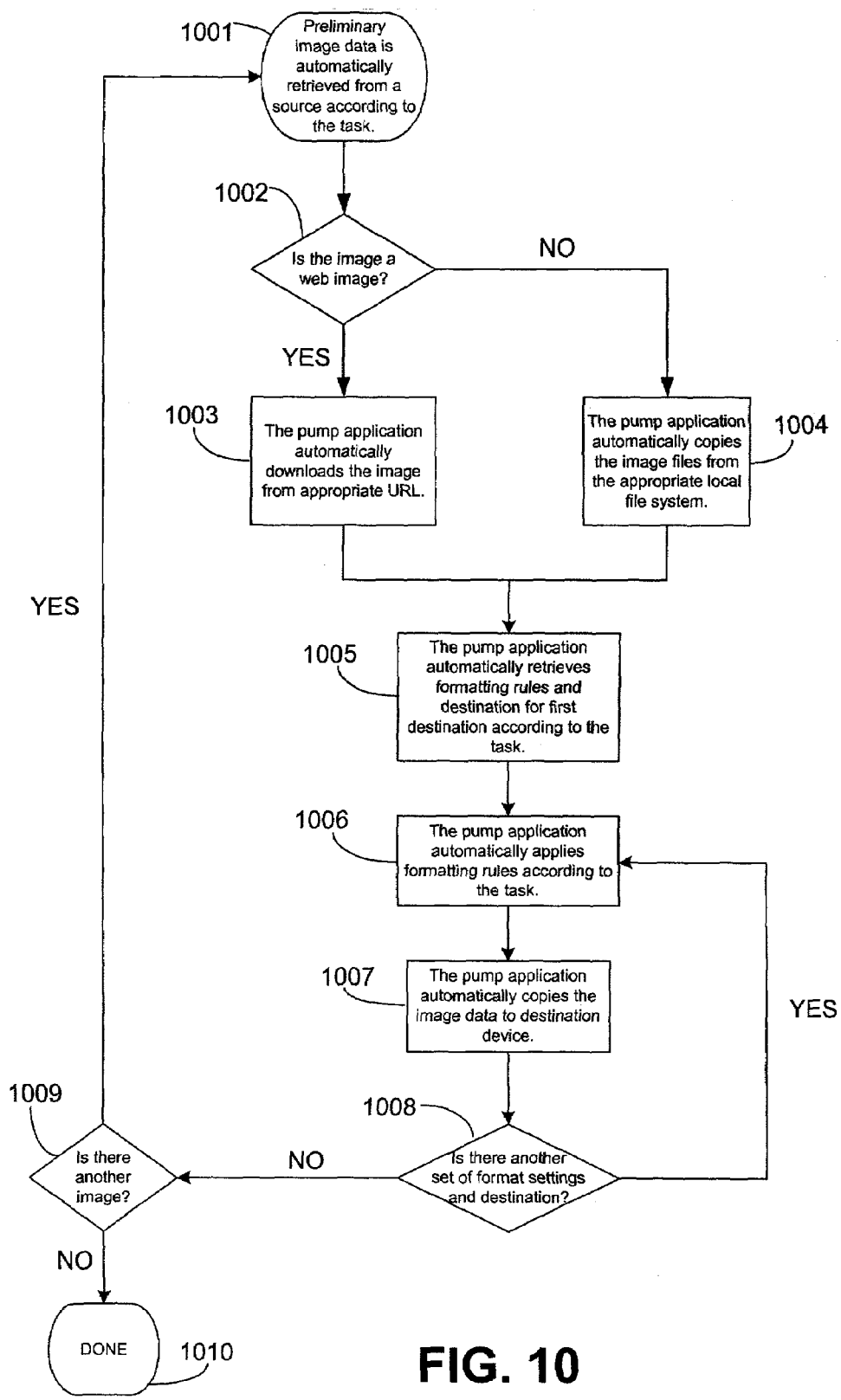
FIG. 10 is a flow chart illustrating a process used by a scheduled task to format and transfer image files from a network or directory in an embodiment of the invention.

FIG. 10 is a flow chart depicting an exemplary process followed during execution of a scheduled task in particular embodiments. In step 1001, according to the task, the pump application automatically retrieves an image name from the source in the manner previously described for user-driven processing. At step 1002, the pump application automatically determines whether the image is a network image, i.e. whether the image resides on a node of a network, or not. If it is determined that the image is a network image, such as a web image, the process transitions to step 1003, wherein the pump application downloads the image from the appropriate network node and saves the image as a temporary file (or leaves in memory for further processing). At this step, the pump application automatically forces a network connection if the image file is on a network, and the user computer is not yet connected to the relevant network. The source image data can be fetched in any manner appropriate for the source device.

If the image data is not on a network, then in step 1004 the image data is automatically copied from a local source, such as the local file system. In step 1005, the pump application automatically retrieves the destination address, or other location, where the image file is to be pumped and the format settings for the first destination. Subsequently, in step 1006, the pump application automatically applies the image data manipulation functions associated with the destination to the temporary image file (or in memory representation) that has been copied, if the image data is retrieved from a local source, or the temporary file or image in memory that has been downloaded, if the image data was retrieved from a network source.

In step 1007, the now properly formatted image data is automatically transferred to its destination. Depending on the destination, this transfer may merely entail copying to another file in the file system or may entail transferring to a digital picture frame that is connected to the processing unit 102 through a serial port interface, and so on.

As described, steps 1001 through 1007 of the scheduled task automatically execute the formatting, manipulation, and transfer of one image file to one destination. The pump application then, at step 1008, automatically determines whether the scheduled task is to deliver the image file to only one destination and apply only one set of format settings or if the pump application is to transfer image data to a plurality of different destinations with their associated format settings. If the pump application determines that there is another destination in step 1008, then for each consecutive destination it automatically applies steps 1006 et seq. In particular, as shown, the pump application sequentially processes the image data to different destinations until all specified destinations have been served. After all the specified destinations have been served, the pump application automatically determines whether there is another image to save (or pump) in step 1009.

If the scheduler determines that there is another image, then the entire process, steps 1001 through 1009, is automatically repeated for each sequential image. The logical process loop shown in FIG. 10 at step 1001 et seq. thus allows a user to format, manipulate, and transfer multiple images to multiple destinations and with multiple sets of format settings without re-invoking the pump application. This allows the pump application to automatically manipulate and transfer multiple image data files to multiple destinations per a scheduled task. When there are no longer any images to process, the pump application terminates at step 1010.

Figure 13:
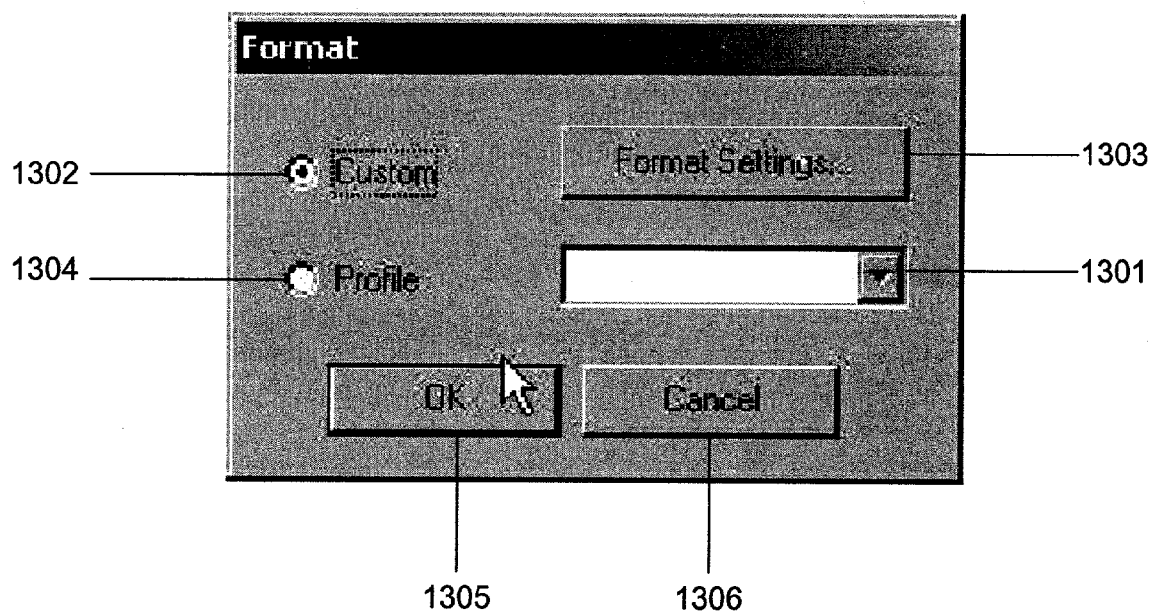
FIG. 13 depicts a user interface, or dialog, presented to a user in an embodiment of the invention to allow the user to set format options for a task.

Illustrated in FIG. 13 is an exemplary user interface for setting format options within a task. This dialog box is presented when the user selects a format option in a prior interface as discussed with respect to FIG. 13. A user selects a pre-set format profile or sets a new format profile for the task. To facilitate this choice, the user selects either the profile selection 1304 to select a pre-set format profile, or the "Custom" selection 1302 to set a new format profile. If the user selects the profile selection 1304, he or she can then choose a format profile from the drop-down menu 1301. The user alternatively specifies a new set of format settings for the task by selecting the "Custom" selection 1302 and clicking the "Format Settings" button 1303, which will invoke a user interface such as that illustrated in FIG. 3.

Figure 14:
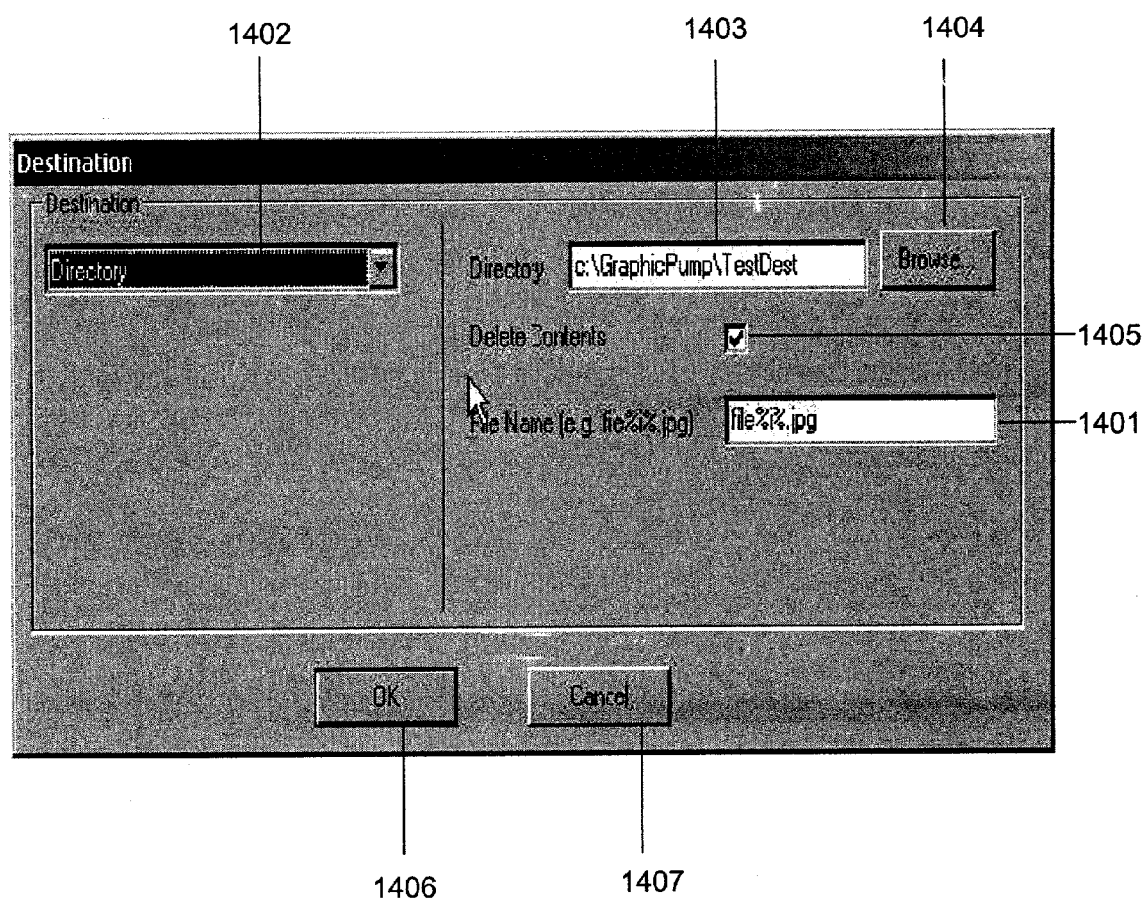
FIG. 14 depicts a user interface, or dialog, presented to a user in an embodiment of the invention in the case where the user has selected a Directory as the destination for all images received through the running of a scheduled task.

Subsequently the user specifies where and how the automatically formatted image file should appear. This allows the scheduler to automatically transfer the images as in step 1007 in FIG. 10. FIG. 14 shows a user interface, usable in an embodiment of the invention, which allows a user to configure destination options for a task. As described previously, possible destinations include, among other things, a directory in a file system and a digital picture frame connected to the processing unit 102 through a serial port interface. If a directory is the destination that is chosen, as illustrated in FIG. 14, then the pump application transfers all images into a directory in a file system. As previously discussed, and as a skilled artisan will recognize, there are other destinations that the image file may be transferred to, such as a node on a network, etc.

The destination function also allows a user to set the task to delete all files that have been previously written by past executions of the program by checking the "Delete Contents" checkbox 1405. Support for this functionality is specific to certain destination types, and in particular embodiments this functionality is required. Examples of such devices include devices with extremely limited memory capacity. A user should enter a template name in data field 1401 to set the names of the files that the pump application generates when it runs a task. For example, the template could contain the characters % i %, as illustrated at 1401. The pump application will then substitute numbers, such as file001.jpg, at run time, replacing file % i %. By deleting pre-existing image files, the pump application can repeatedly update the images displayed on a device, such as pursuant to a scheduled task, without overloading the device memory facilities. In one embodiment, the user may have the task append the images onto an ever-expanding directory of images, such as a series of pictures taken at 10-minute intervals.

A specific example of a task in operation is given hereinafter to clarify the principles of this embodiment. Thus, for example, a user using the interfaces described above establishes a scheduled task to be executed by the pump application to retrieve and format images daily at 4:00 P.M. from a node on the Internet. He sets the destination of these images as a screensaver directory in the hard disk of his personal computer by entering the proper file path in data field 1403. He also chooses to delete pre-existing contents by selecting checkbox 1405 in order to delete the prior screensaver file saved the day before. Thus, the user's personal computer displays a new screensaver each day at 4:00 P.M., the prior screensaver image file having been deleted.

Referring again to FIG. 14, if the user selects the image data destination from drop down menu 1402 to be a Port, then the file will be copied to a digital picture frame or other device connected to a serial port. In an embodiment, the user manually specifies which serial port the target digital picture frame, or other device, is connected to. In addition, the media, such as Compact Flash or Smart Media, should be specified. However, in an alternative embodiment, the pump application automatically detects both the serial port that the digital frame, or other device, is connected to and the media type supported by the frame.

In a further embodiment, the external target device may support file naming. Thus for such devices, such as the DIGI-FRAME version k and above, the user names the file being sent to the picture frame in order to facilitate easier location thereafter.

Figure 11:
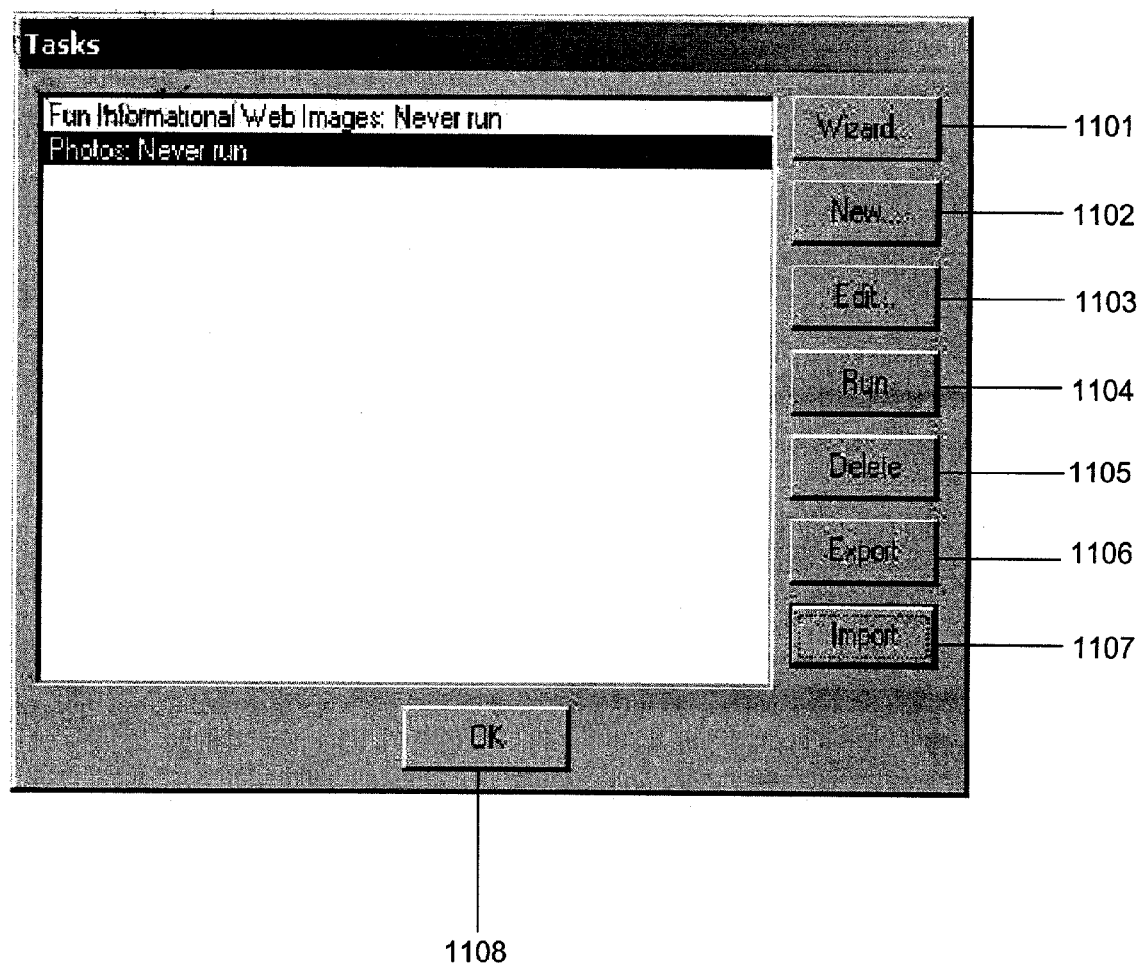
FIG. 11 depicts a user interface, or dialog, presented to a user in an embodiment of the invention to facilitate task setting by the user.

The user is preferably given an option to create a new task by utilizing a "New Task Wizard," as illustrated in FIG. 11. The new task wizard is a facility that guides a user through the process of creating a task, much as some programs use wizards to guide users through the process of configuring a network connection or writing a letter. Using the illustrated interface, the user need only actuate a button 1101 to run the new task wizard. Typically, only a subset of possible options is presented when running the new task wizard in order to simplify the user experience. For some users, the decreased flexibility is more than compensated for by the wizard's ability to help a user quickly and easily define tasks.

Once invoked, the wizard queries the user as to the intended use of the pump application, be it updating screen saver images, moving images to another device, etc. Next, the wizard asks appropriate questions and fills in reasonable defaults for the remaining format and destination settings appropriate for this usage of the application. The developer can configure the wizard so that the questions that the wizard asks are as simple or as complex as is appropriate for the desired task and audience. For example, the user may specify updating screen saver images as the intended use. Thereafter, the wizard may ask the user for display dimensions of the monitor being used to display the screen saver and the amount of time the user wishes to view each screen saver. Finally, the wizard queries the user as to which image files should be manipulated and transferred in the new task.

It is not necessary for the user to use the new task wizard to create a new task. A user instead may create a new task by selecting the "New" button 1102 from the file options presented on the UI. While this increases the complexity of the user experience over that presented by the new task wizard option, it also allows the user greater control of the process parameters. Via the dialog box of FIG. 11, a user may also edit an existing task by selecting "Edit" button 1103, or run a task by selecting "Run" button 1104, be it on demand, or in accordance with a schedule. A user may also delete a task, export a task to a graphic pump task (GPT) file, import a task from a GPT file, and close the dialog, by selecting one of buttons 1103–1108, respectively.

In an alternative embodiment, rather than having the user of the application applying the format settings and devices specify a file or files to be processed and a time to perform the processing, the user uses the application to define a set of "rules" about how to process an image once it arrives in a pre-determined location or through a pre-determined set of rules. This image might arrive through a variety of means including instant messaging applications, e-mail, or simply the appearance of a file on a sharepoint (e.g. ftp). The formatting and destination might also vary based on "meta-data" about the image, such as who sent it, where it was sent, or even AI that detects the content etc. This allows the receiving user to save a received image file so that it is formatted and configured in accordance with the receiving user's preferences and the receiving device's capabilities, for example, dependent upon the identification of the user that sent the image. For example, suppose a sending user shares a photo with a receiving user via email, instant messenger, or other image transfer facility. In the present embodiment, once the receiving user receives the shared image data, the pump application running on the receiving user's device automatically applies pre-set format settings to the received data, and automatically transfers the data to a pre-set destination. In another embodiment, the pump application might format for and transfer the data to multiple destinations.

This embodiment is facilitated via a rule on the receiving user's computer that correlates a characteristic of the image data with a set of format settings and a destination. The image data characteristic used in the rule can be any of a number of different characteristics, such as meta-data embedded, or associated, with the image data, an indication of the identification of a second user, a filename, and the contents of a file. Generally, the meta-data is definitional data that provides information about or documentation of other data managed within the application or environment, such as name, size, data type, where it is located, how it is associated, ownership, etc.

For example, a user receives an image via email from sender "Mom." The sender "Mom" is correlated to a profile, created by the user and accessible to the pump application, containing formatting rules and a destination selection or selections. Thus the pump application recognizes the sender, retrieves the profile associated with that sender, and subsequently properly formats and transfers the image data to a number of devices. In this example, the preset format information causes the pump application to compress and resize the data, and the preset destination information causes the pump application to transfer the data to a screensaver file. In one embodiment, the pump application reads the rules and applies multiple format settings and transfers the image data to multiple destinations.

In a further embodiment, the receiving user retrieves image data from a sending location, wherein the image data was transferred to the receiving user by a sending user. At the receiving location, the pump application reads a rule correlating a characteristic of the image data display features with a set of image data format settings and a display device. However, in this embodiment, the characteristic allows the second location to logically understand what the image data describes. The pump application then applies the set of image data display format settings to the received image data, and transfers the image data to a display device. For example, the user may move pictures that are similar in color, brightness, and general shapes and the pump application understands that they are pictures, such as images of automobiles. The pump application would then apply the format settings for this type of image data (automobiles) and transfer the image to the location where the user displays automobile images. In another embodiment, the pump application applies multiple correlating format settings to multiple images and transfers the image data to multiple destinations.

The pump application described herein also employs plug-ins when necessary to allow the pump application to retrieve an image and save it to a new device using a format or other options not natively supported by the pump application. This allows the pump application to support new sources of images, new destinations for saving images, and even new formatting rules and settings to be performed by the application.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

I claim:

1. A method of formatting and transferring image data from a first location to a second location, the method comprising:

retrieving the image data from the first location;

receiving a command from a user to save the image data to the second location;

in response to receiving a command from a user to save the image data to the second location, presenting to the user an interface for selecting a format profile comprising a set of image data format settings, wherein the interface also comprises a graphic actuator for receiving a command from the user to complete the formatting and saving of the image data to the second location;

receiving via the interface a user selection of the format profile comprising the set of image data format settings, and a user command to complete the formatting and saving of the image data to the second location; and in response to receiving a user selection of the format profile and the user command to complete the formatting and saving of the image data to the second location:

formatting the image data in accordance with the set of image data format settings to provide formatted image data, and saving the formatted image data to the second location.

2. The method according to claim 1 wherein the set of image data format settings are saved as a named set.

3. The method according to claim 1 wherein the step of receiving a user selection of a set of image data format settings comprises the step of receiving from a user a name associated with a saved set of image data format settings.

4. The method according to claim 1 wherein the step of receiving a user selection of a set of image data format settings comprises the step of receiving a user command specifying selected format options to be applied to the image data.

5. The method according to claim 1 wherein the first location is selected from the group consisting of: a file stored in a non-volatile memory of a personal computer, a file stored in a volatile memory of a personal computer, a file stored on a node of a network, a scanner logically connected to the processing unit of a personal computer, a peripheral device, and a capture device.

6. The method according to claim 1 wherein the second location is selected from the group consisting of: a file stored in a non-volatile memory of a personal computer, a file stored in a volatile memory of a personal computer, a file stored on a node of a network, a peripheral device, and a file stored on a digital picture frame.

7. The method according to claim 5 wherein the first location and the second location are the same.

8. The method according to claim 6 wherein the second location is a file stored in a non-volatile memory of a personal computer and saving of the image data to the second location further comprises the step of automatically overwriting image data at the second location without generating an error message for display to the user.

9. The method according to claim 1 wherein the second location is a file stored on a digital picture frame, and saving of the image data to the second location further comprises the step of transferring the image data to the digital picture frame.

10. The method according to claim 9 further comprising the steps of:
automatically detecting that the digital picture frame is connected to the personal computer; and
automatically determining a type of media usable by the digital picture frame.

11. The method according to claim 1 wherein saving of the image data to the second location further comprises the step of passing the image data from the first location to the second location by the use of a file transfer protocol.

12. The method according to claim 1 wherein the image data corresponds to an image retrievable over a network, and wherein the first location is a temporary file in a personal computer to which the image data has been downloaded from the network, wherein saving of the image data to the second location further comprises the step of transferring image data over the network to the second location.

13. The method according to claim 12 wherein the image data represents a picture on a page retrievable from a node of the network.

14. The method according to claim 1 further including the step of saving the image data to a plurality of locations.

15. The method according to claim 14, wherein the image data, when saved to the plurality of locations, is formatted differently for at least two of the plurality of locations respectively.

16. The method according to claim 1 wherein the step of retrieving the image data from the first location further comprises the step of retrieving a plurality of sets of image data from a plurality of locations and wherein the step of formatting the image data further comprises the step of applying at least one named set of image format settings to the plurality of sets of image data.

17. A method of automatically formatting and transferring image data from an image data source to an image data destination, the method comprising:
providing a task for automatically formatting and transferring the image data, wherein the task describes a scheduled time for formatting and transferring the image data, an identification of the image data source, an identification of the image data destination, and a set of image data format settings;
determining automatically that the scheduled time has arrived; and
in response to determining automatically that the scheduled time has arrived:
retrieving the image data automatically from the image data source,
formatting the image data automatically in accordance with the set of image data format settings to provide formatted image data, and
transferring the formatted image data automatically to the image data destination.

18. The method according to claim 17 wherein the set of image data format settings are saved as a named set.

19. The method according to claim 18 wherein the step of formatting the image data automatically in accordance with the set of image data format settings comprises the step of applying the named set automatically to the image data.

20. The method according to claim 17 wherein the identification of the image data source is a list of at least one URI entered by the user.

21. A method according to claim 17 wherein the identification of the image data source corresponds to a graphical pump album file.

22. The method according to claim 17 wherein the image data source is selected from the group consisting of: a file stored in a non-volatile memory of a personal computer, a file stored in a volatile memory of a personal computer, a file stored on a node of a network, a scanner logically connected to the processing unit of a personal computer, a peripheral device, and a capture device.

23. The method according to claim 17 wherein the image data destination is selected from the group consisting of: a file stored in a non-volatile memory of a personal computer, a file stored in a volatile memory of a personal computer, a file stored on a node of a network, a peripheral device, and a file stored on a digital picture frame that is logically connectable to a personal computer.

24. The method according to claim 23 wherein the second location is a file stored in a non-volatile memory of a personal computer and the step of transferring the image data automatically further comprises the step of automatically overwriting image data at the image data destination without generating an error message for display to the user.

25. The method according to claim 22 wherein a location of the image data source and a location of the image data destination are the same.

26. The method according to claim 17, wherein the identification of the image data destination identifies a plurality of image data destinations and the set of image data format settings includes a plurality of sets of image data format settings, the method further comprising the steps of:
applying to the image data automatically the plurality of sets of image data format settings to create a plurality of sets of formatted image data; and
transferring at least one of the plurality of sets of formatted image data to at least one of the plurality of image data destinations.

27. The method according to claim 17 further including the step of saving the image data to a plurality of image data destinations.

28. The method according to claim 27, wherein the image data, when saved to the plurality of image data destinations, is formatted differently for at least two of the plurality of image data destinations respectively.

29. The method according to claim 17 wherein transferring the image data to the image data destination further comprises the step of passing the image data from the image data source to the image data destination by the use of a file transfer protocol.

30. The method according to claim 17 wherein the step of retrieving the image data from the image data source further comprises the step of automatically retrieving a plurality of sets of image data from a plurality of image data sources and wherein the step of automatically formatting the image data further comprises the step of applying at least one named set of image format settings to the plurality of sets of image data.

31. A method for transferring and sharing image data comprising:

receiving image data at a first location, wherein the image data was transferred to the first location from a second location;

at the first location, reading a rule correlating a characteristic of the image data with a set of image data format settings to apply to the image data and a third location to which to transfer the image data;

applying automatically the set of image data format settings to the received image data, in accordance with the rule, to provide formatted image data; and transferring automatically the formatted image data to the third location in accordance with the rule.

32. The method according to claim 31, wherein the image data characteristic is selected from the group consisting of: meta-data associated with the image data, an indication of a human user at the second location, an indication of an identity of the second location, a filename, and a content of a file.

33. The method according to claim 31 wherein the image data format settings are saved as a named set.

34. The method according to claim 31, wherein the characteristic of the image data is correlated by rule with a plurality of third locations and a plurality of sets of image data format settings, further comprising:

applying the plurality of image data format settings to the image data to create a plurality of sets of formatted image data; and transferring the plurality of sets of formatted image data to the plurality of third locations.

35. The method according to claim 31, wherein the first location is a memory location within a personal computer and the third location is another memory location within the personal computer.

36. The method according to claim 31 wherein the second location is a file on the file system of a personal computer of a second user.

37. The method according to claim 31, wherein the second location is selected from the group consisting of: a file in a non-volatile memory of a personal computer of a second user, a file in a volatile memory of a personal computer of a second user, a file stored on a node of a network, a scanner logically connected to a processing unit of a personal computer of a second user, a peripheral device, and a capture device.

38. The method according to claim 31, wherein the third location is selected from the group consisting of: a file in a non-volatile memory of a personal computer of a second user, a file in a volatile memory of a personal computer of a second user, a file stored on a node of a network, a digital picture frame connectable to a personal computer, a peripheral device, and a capture device.

39. The method according to claim 31 wherein the characteristic of the image data allows a logical determination to be made as to the subject of the image data.

40. The method according to claim 39 wherein the characteristic of the image data is correlated by rule with a plurality of locations and a plurality of image data format, settings further comprising:

applying the plurality of image data format settings to the image data to create a plurality of sets of formatted image data; and transferring the at least one of the plurality of sets of formatted image data to at least one of the plurality of locations.

41. The method according to claim 31 wherein the step of receiving image data at the first location further comprises the step of automatically retrieving a plurality of sets of image data from a plurality of second locations and wherein the step of applying automatically the set of image data format settings further comprises the step of applying at least one named set of image format settings to the plurality of sets of image data.

42. The method according to claim 31 further comprising the steps of:

at the first location reading a plurality of rules correlating a plurality of image characteristics to a plurality of image data format settings and third locations;

applying at least one of the plurality of image data format settings to the image data; and transferring the image data to at least two of the plurality of third locations.

43. The method according to claim 42 wherein the image data, when transferred to the at least two of the plurality of third locations, is formatted differently for the at least two of the plurality of third locations.

44. The method according to claim 31, wherein the step of receiving image data further comprises the step of retrieving a plurality of sets of image data from a plurality of second locations, and wherein the step of applying automatically the set of image data format settings further comprises the step of applying at least one named set of image format settings to the plurality of sets of image data.

45. The method according to claim 31 wherein transferring the image data to the third location further comprises the step of passing the image data from the first location to the third location by the use of a file transfer protocol.

46. The method according to claim 31 further including the step of saving the image data to a plurality of third locations.

47. For use in processing and transferring an original image using a computer having a display device, a computer-readable medium having thereon instructions for performing steps comprising:

retrieving image data from a first location;

receiving a command from a user to save the image data to a second location;

in response to receiving a command from a user to save the image data to the second location, presenting to the user an interface for selecting a format profile comprising a set of image data format settings, wherein the interface also comprises a graphic actuator for receiving a command from the user to complete the formatting and saving of the image data to the second location;

receiving via the interface a user selection of the format profile comprising the set of image data format settings, and a user command to complete the formatting and saving of the image data to the second location; and in response to receiving a user selection of the format profile and the user command to complete the formatting and saving of the image data to the second location:

formatting the image data in accordance with the set of image data format settings to provide formatted image data, and of saving the image data to the second location.

48. The method of claim 1, wherein the set of image data format settings are associated with display features of a receiving device.

* * * * *